United States Patent Office 3,582,435
Patented June 1, 1971

3,582,435
TIRE BUILDING APPARATUS INCLUDING MEANS FOR ENCLOSING TIRE BEADS IN TIRE CARCASS MATERIAL IN THE CONSTRUCTION OF A TIRE
Larry C. Frazier, Sun City, Ariz., assignor to National-Standard Company, Niles, Mich.
Filed Dec. 2, 1968, Ser. No. 780,435
Int. Cl. B29h 17/22
U.S. Cl. 156—401
8 Claims

ABSTRACT OF THE DISCLOSURE

An apparatus for building pneumatic tires embodying an intermediate assembly and an end assembly at each end of the intermediate assembly for supporting tire carcass material initially in the form of a tubular cylinder, each of the end assemblies embodying tire bead shoulder forming means for displacing the tire carcass material raidally outwardly to form tire bead shoulders for engagement with tire beads held concentrically outwardly of the portions of the tire carcass material displaced to form the tire bead shoulders, ply turn-up means for encasing the tire beads at the tire bead shoulders, in which the intermediate supporting members are movable radially and circumferentially relative to each other to form the tire carcass material into substantially torous configuration, and in which the encased tire beads are supported for axial movement toward each other upon formation of the tire carcass material into substantially torous configuration.

BRIEF SUMMARY OF THE INVENTION

The present invention relates to the pneumatic tire building art and is concerned with the building of tires starting with tire carcass material of tubular cylindrical configuration. The apparatus and method lend themselves for building radial tires but if desired bias angle tires may also be constructed.

CROSS REFERENCES TO RELATED APPLICATIONS AND PATENTS

Larry C. Frazier, application Ser. No. 663,931, filed Aug. 24, 1967, now Pat. No. 3,485,692 dated Dec. 23, 1969.

Thomas H. Pearce and Larry C. Frazier, application Ser. No. 502,064, filed Oct. 22, 1965, now Pat. No. 2,414,446 dated Dec. 3, 1968.

Edwin C. Mallory and Larry C. Frazier, application Ser. No. 567,275, filed July 22, 1966, now Pat. No. 3,-490,980 dated Jan. 20, 1970.

Larry C. Frazier and Edwin E. Mallory, application Ser. No. 647,732, filed June 21, 1967, allowed Apr. 7, 1970; and Larry C. Frazier, application Ser. No. 736,363, filed June 12, 1968.

The invention resides in an arrangement of an intermediate assembly characterized by a plurality of interleaved intermediate supporting members movable radially inwardly and outwardly and circumferentially relative to each other, and end assemblies, one at each end of the intermediate assembly, which together in the radial inward positions of the intermediate supporting members define a cylindrical supporting surface for supporting tire carcass material in the form of a tubular cylinder. In the radial outer positions of the intermediate supporting members, the tubular cylinder of tire carcass material for a radial tire is formed into substantially torous configuration approximating that of a completed tire. The aforementioned end assemblies each comprise an end frame which provides for the support of tire bead shoulder forming means for radially displacing the tire carcass material to form tire bead shoulders inwardly of the ends of the tubular cylinder of tire carcass material. The apparatus further incorporates tire bead setting means for holding tire beads concentrically outwardly of the outer surface of the tubular cylinder of tire carcass material against which the tire bead shoulders are displaced for application of the tire beads to the tire bead shoulders. With the tire beads initially held in the aforementioned position, the invention further comprehends the provision of ply turn-up means for turning up end portions of the tire carcass material to encase the tire beads while initially supported and after the tire bead setting means are released. Following turning up of the opposite ends of the tubular cylinder of tire carcass material secondary supporting means are movable axially inwardly to support the encased tire beads and at this position sidewalls or chafter strips or other tire components may be applied at the sidewall portions of the tubular cylinder of carcass material. Thereafter, the intermediate assembly may be actuated to move the intermediate supporting members radially outwardly to displace the central portion of the cylinder of tire carcass material while the encased tire beads are axially moved inwardly toward each other while supported by the secondary supporting means. The tire beads are thus supported in the turning up of the outer ends of the tubular cylinder and the encased tire beads are supported concentrically upon radial outward displacement of the intermediate assembly to provide the formed tire carcass material into substantially torous configuration, and with the tire beads being concentrically supported throughout the forming operation.

The above and other advantages and objects of the invention will appear from the following detailed description of a preferred embodiment of the invention shown in the accompanying drawings in which:

Figure 1A:
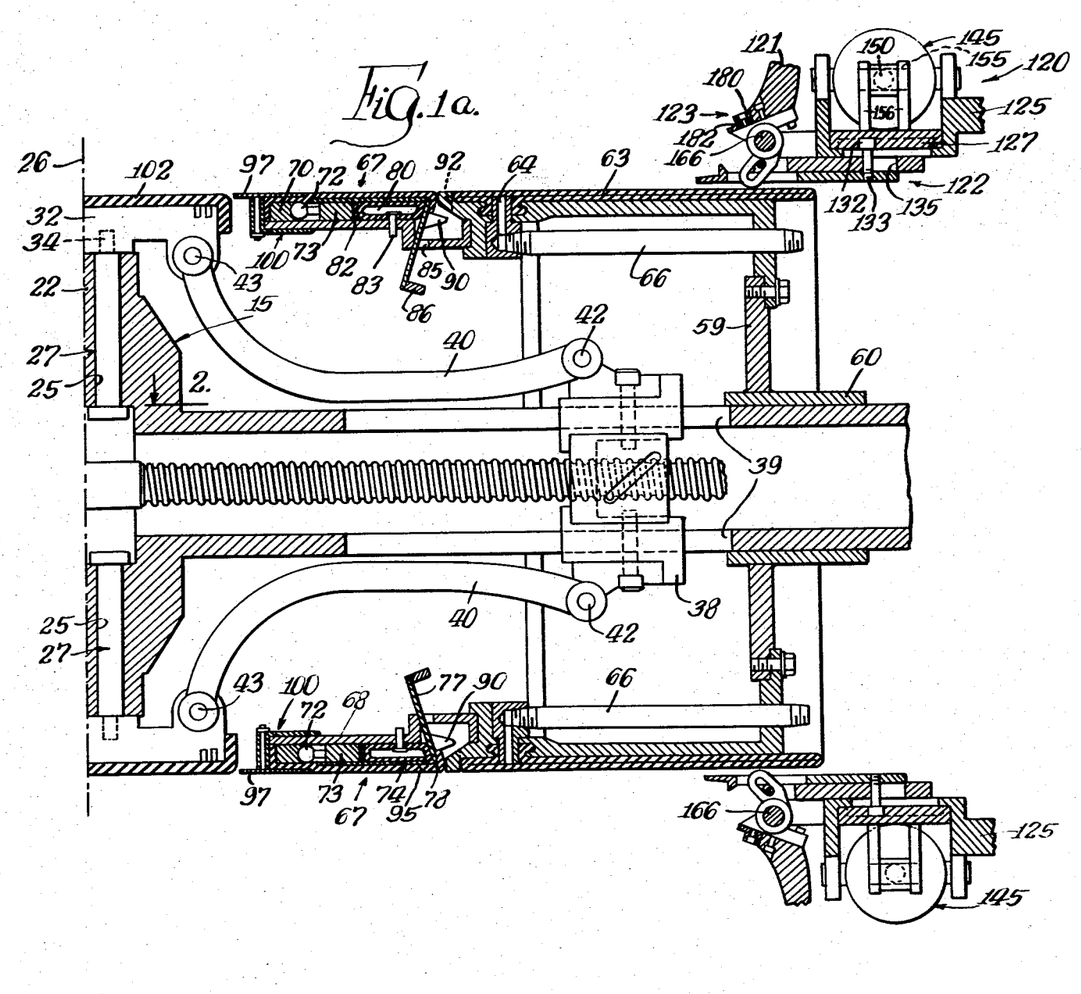
FIGS. 1a and 1b show longitudinal vertical sections of the right and left hand portions, respectively, of a pneumatic tire building apparatus of the invention, and which figures joined on the vertical dot-dash center lines illustrate a full sectional view, certain parts in the two figures being shown in elevation and in which an intermediate assembly and end assemblies of the apparatus are in positions defining a cylindrical surface for supporting tire carcass material in the form of a tubular cylinder therearound.
Figures 1B, 2:
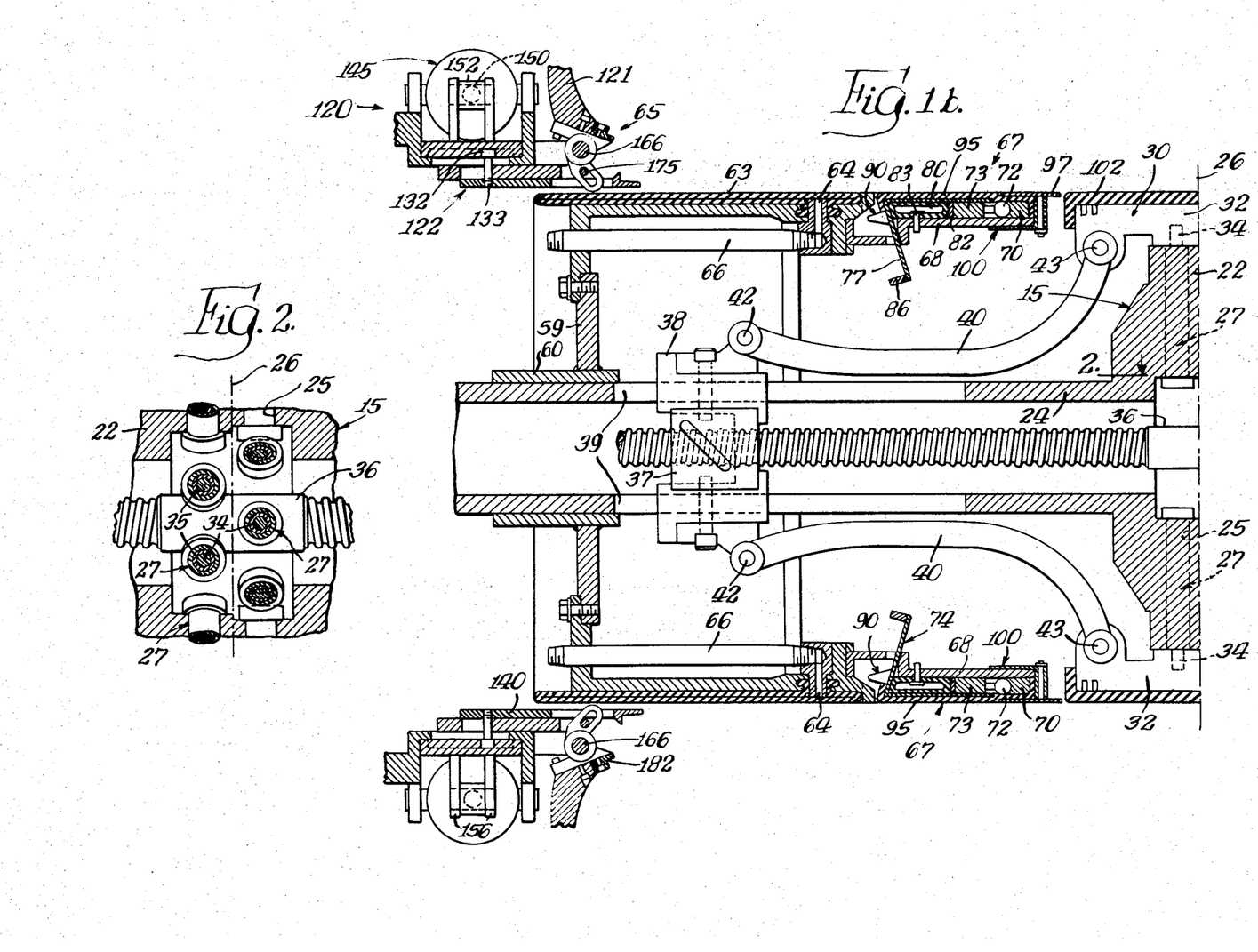
FIG. 2 is a detail sectional view taken on line 2—2 of FIGS. 1a and 1b looking in the direction indicated by the arrows.

Referring now to FIGS. 1a and 1b of the drawings the tire building apparatus of the invention there shown comprises an intermediate assembly, indicated generaly at 15, and left and right hand end assemblies 16, one at each end of the intermediate assemblies 15.

Figure 3:
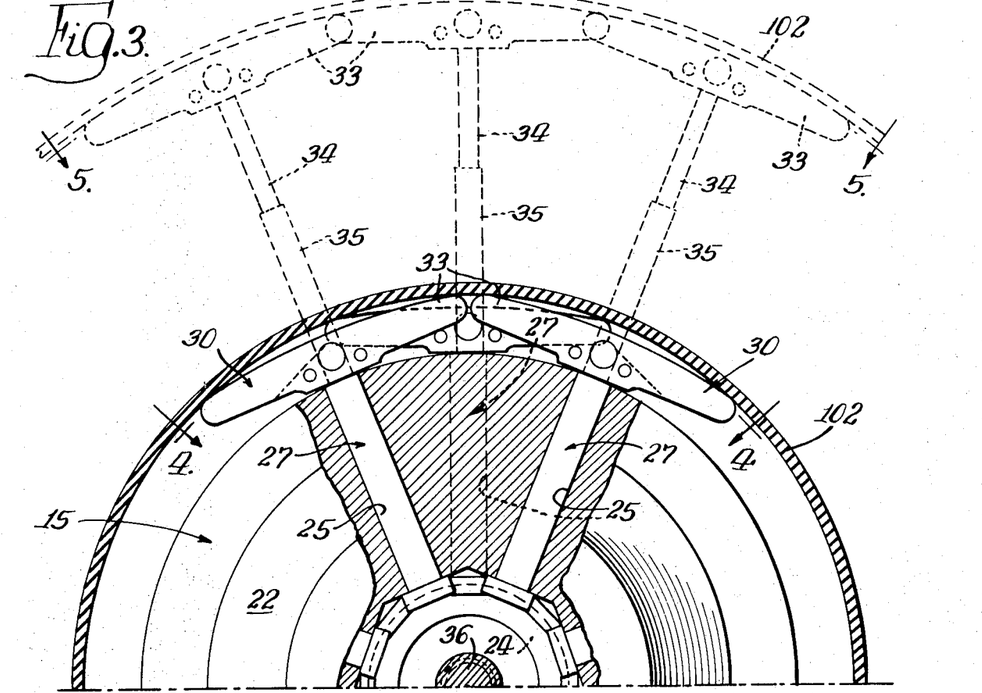
FIG. 3 is a vertical sectional view taken on line 3—3 of FIG. 1a looking in the direction indicated by the arrows, and showing in dotted lines the positions of the parts in the radial outer positions of the intermediate supporting members of the intermediate assembly.

The intermediate assembly 15 comprises a hub member 22 intermediate the ends of a hollow shaft 24 and which hub member is formed with a plurality of radially extending bores 25 which as best seen in FIG. 2 lie alternately to opposite sides of the center line 26 of the hub. The several bores 25 each receive telescopic assemblies 27, one for each of a plurality of circumferentially arranged intermediate sections 30 of the intermediate assembly 15. As best seen in FIGS. 1a, 1b, 3 and 4, each intermediate section 30 comprises a body portion 32 having a plurality of axially spaced apart intermediate supporting members or blades 33, and in which the intermediate supporting members or blades 33 of circumferentially adjacent intermediate sections 30 are interleaved, with the ends of the intermediate supporting members 33 of one intermediate section fitting into the spaces between adjacent blades of circumferentially adjacent intermediate sections. Each of the several intermediate sections 30 are mounted at the outer ends of an inner telescopic member 34 mounted in the outer telescopic member 35 of the telescopic assembly 27. The inner telescopic members 34 are thus arranged within the outer telescopic members 35 for movement radially inwardly and outwardly in a manner to be described and upon such radial inward and outward movement, the blades or intermediate supporting members also move circumferentially relative with respect to each other so that the outer surface of the intermediate assembly, depending upon the radial inward and outward positions of the several intermediate sections, define rigid supporting surfaces of different diameters. As best seen in FIG. 3, the outer circumferential surfaces of the intermediate supporting members or blades 33 have a convex configuration to provide substantially cylindrical supporting surfaces in the radial inward and outward positions of the several intermediate sections.

The hollow shaft 24 may be mounted for rotation at its opposite ends in any suitable manner. Drive shaft means 36 supported for rotation in suitable bearings (not shown), and driven from a power source (not shown) extends axially within the hollow shaft or sleeve 24. The opposite end portions of the drive shaft 36 are oppositely threaded for receiving end head components 37 which are reciprocated axially toward and away from each other upon rotation of drive shaft means 36. The end head components 37 may be of conventional ball nut construction upon which a guide block 38 is mounted with the guide block 38 fitting in an axially extending guide slot 39 in the hollow shaft 24 so that upon rotation of drive means 36 the guide blocks 38 may be moved axially toward and away from each other in the guide slots 39 of the hollow shaft 24. A plurality of levers, such as shown at 40, are pivotally mounted at one end as at 42 in the guide blocks 38. Each of the levers 40 at its other end is pivotally mounted as at 43 in an intermediate supporting member 32. A lever 40 is provided for each of the intermediate sections 30 with the several levers being arranged in circumferential array about hollow shaft 24 and extending as noted from the guide blocks 38 to each of the intermediate sections 30.

Figure 4:
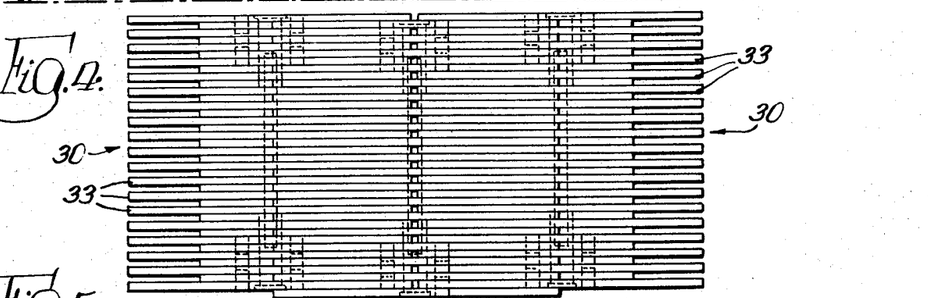
FIG. 4 is a plan view of the intermediate assembly taken along the line 4—4 of FIG. 3 with the intermediate supporting members in their radial inward position.
Figure 5:
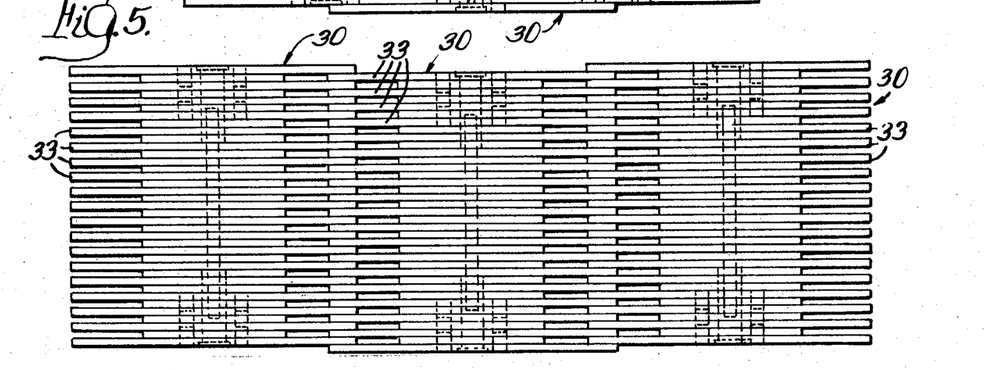
FIG. 5 is a plan view of the intermediate assembly taken along the line 5—5 of FIG. 3 with the intermediate supporting members in their radial outer positions.

In the components of the apparatus thus far described it will be observed that upon the axial inward movement of the guide blocks 38 toward each other, the intermediate sections 30 through the levers 40 effect radial outward movement of the intermediate sections 30, as, for example, from the position shown in FIG. 4 at which they define a cylindrical surface of minimum diameter to the positions shown in FIG. 5 to dispose the intermediate sections of the intermediate assembly in their radial outward positions defining a cylindrical supporting surface of maximum diameter. The telescopic assemblies 27 will accurately guide the intermediate sections radially inwardly and outwardly upon movement of the guide blocks 38 axially toward and away from each other.

The aforementioned end assemblies 16 each comprise end frames, indicated generally at 59, having an annular hub portion 60 preferably slidably mounted for adjustment purposes on the outer periphery of and at the opposite ends of hollow shaft 24. An annular flange 61 of each end frame extends axially inwardly and which, together with an annular supporting member 62 at their inner ends provide for supporting inflatable ply turn-up bag means 63 forming in part ply turn-up means 65. A conduit 66 having connection with a source of fluid under pressure (not shown) provides for admitting fluid under pressure through orifice 64 into ply turn-up bag means 63 to inflate the same or to establish bleed to deflate the same.

Figure 17:
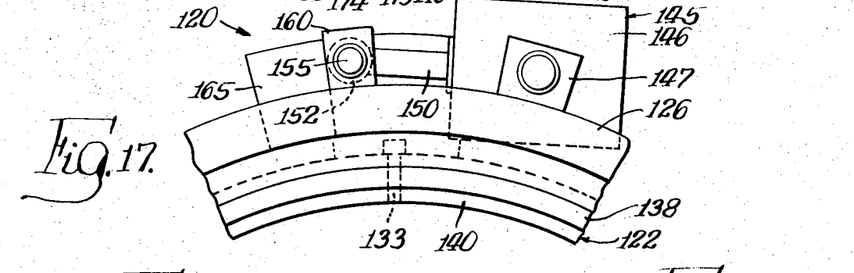
FIG. 17 is an end elevational view of the parts shown in FIG. 15.

The end frames 59 also provide for the support of tire bead shoulder forming means indicated generally at 67. The tire bead shoulder forming means 67 comprises an inner annular frame 68 fixed to and extending axially inwardly from the annular supporting member 62 toward the intermediate assembly 15. The frame member 68 provides for the support of a plurality of circumferentially arranged ball socket members 70 each of which receive as best seen in FIGS. 1a, 1b and 17 a pair of ball like bearing members 72 connected with a supporting block 73 to each of which a plurality of circumferentially arranged tire bead shoulder forming fingers 74 are secured. The bead shoulder forming fingers 74 each include a first leg portion 76 and a second leg portion 77 which at their juncture forming a knee portion 78 for displacing the tire carcass material to form a tire bead shoulder.

Figure 18:
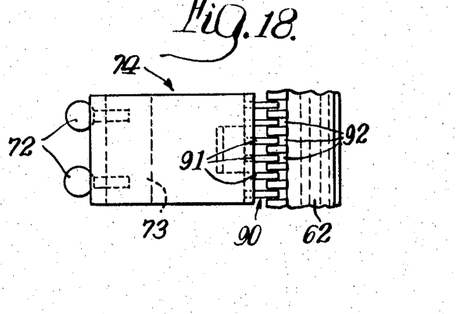
FIG. 18 is a plan view of certain of the components of the apparatus at the tire bead shoulder forming means.
Figure 19:
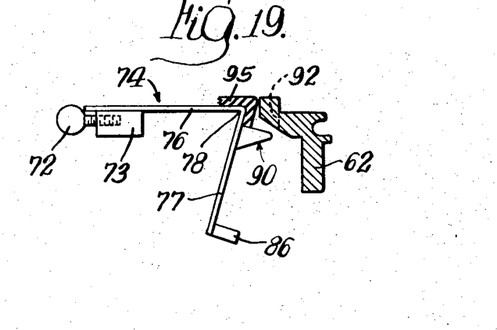
FIG. 19 is an end view of the components shown in FIG. 18.

An annular inflatable tire shoulder forming bag means 80 lies in a chamber defined by frame member 68, portions of the legs of fingers 74 and an end frame member 82 adjacent the outer end of the supporting block 73. A conduit 83 extends through frame member 68 and has connection with the inflatable bag 80 through which fluid under pressure is admitted to the bag 80 to effect expansion of the bag and for relieving fluid under pressure from the bag to deflate the same. It will be seen that the legs 77 of the fingers 74 extend through an opening 85 formed in the frame member 68 and the outer end of the leg portion 77 is provided with a stop flange 86 which as typically seen in FIG. 7 engages the end frame member 68 to limit outward displacement of the tire bead shoulder forming means. As best seen in FIGS. 18 and 19 the legs 77 of fingers 74 are provided with first or initial bead supporting means 90, defined by a plurality of teeth 91, which are arranged circumferentially for passing through radially inwardly extending slots 92 formed in the annular ring member 62 to enable movement of the teeth 91 from the position shown in FIG. 1a to the position shown, for example, in FIG. 7 of the drawings.

It will be seen that in the tire bead shoulder forming means upon admission of fluid under pressure into the tire shoulder forming bag 80 that the several fingers 74 are moved generally radially outwardly about the pivot of the ball like bearings 72 to their outermost position as limited by engagement of the stops 86 with the frame member 68. Preferably, the tire bead shoulder forming means is encased in an annular rubber sleeve 95 the outer peripheral surface of which with bag 80 deflated lies in the same cylindrical plane as the outer periphery of the ply turn-up bag 63 when deflated.

The end assemblies 16 each further comprise gap shield means as indicated at 97 supported on stem members 98 mounted in the sleeve 99 of a flange member 100 secured to the inner end of frame member 68. The gap shield 97 extends axially outwardly from the end flanged edges of a cylindrical rubber sleeve 102 which is preferably provided to encase the several intermediate sections 30 of the intermediate assembly 15. The gap shield at its axially outer end is preferably embedded in the rubber of the tire bead shoulder forming means 67 to provide in the position of the parts shown in the FIGS. 1a and 1b of the drawings a single continuous cylindrical surface defined by the outer peripheries of the rubber encasing sleeve 102 for the intermediate assembly, the aforementioned gap shield 97, and the rubber sleeve 95 for the tire shoulder forming means 67, and the outer surface of the inflatable ply turn-up bag 63.

Reference may now be had to FIGS. 6, 15, 16 and 17 in which there is shown a carrier assembly 120, one at each end of the apparatus and mounted by means (not shown) for axial movement toward and away from each other, and each of which comprise a plurlity of circumferentially arranged ply turn-up bag pusher means or segments 121 forming, in part, the aforementioned ply turn-up means 65, tire bead setting means 122, and second or auxiliary bead supporting means 123.

Each carrier assembly 120 is defined by a main frame in the form of an annular ring like member 125 having a radially outwardly U-shaped channel defined by radially outwardly extending flange portions 126. A ring 127 is mounted between the flanges 126 of the frame member 125 for circumferential movement relative to the frame member 125. The ring 127 is formed with a slot 130 extending diagonally transversely thereof and into which the head 132 of a cam pin 133 is disposed. The body portion of pin 133 extends through a lost motion slot 135 of an annular member 138 secured to the inner end portions of the flanges 126 of the main frame 125, and is threaded into the slide bar 140 of the second or auxiliary bead supporting means 123. A fluid pressure actuated piston and cylinder assembly 145 has the cylinder 146 thereof mounted in trunnions 147 carried by the flanges 126. A piston rod 150 of the piston and cylinder assembly 145 is connected at its outer end to a bearing sleeve 152 which fits about a pin 155 the opposite ends of which are mounted in a pair of spaced apart outwardly extending flanges 160 fixed to the movable ring 127.

The ply turn-up bag pusher means 121 comprises a plurality of circumferentially arranged segment members 165 each pivotally mounted on a pin 166 extending between a pair of brackets 167 secured as by welding to the axially innermost flange 126 of the main frame 125. A pair of spaced apart lugs 170 are fixed to the segment member and are disposed about pin 166 inwardly of brackets 167. A cam 172 is secured at one end to the lugs 170 and is provided at its other end portion 173 with an elongated slot 174 into which a pin 175 mounted at the inner end of the annular member 138. The slide bar 140 of the second or auxiliary bead supporting means 123 is formed with a slot 180 through which the slotted end portion 173 of the cam 172 may extend.

The tire bead setting means 123 comprises an annular bead holder member 180 secured to the ply turn-up bag pusher means 121, and is formed with an internal annular shoulder 182 for receiving and supporting a tire bead. The carrier assemblies 120 as will be described are adapted to be moved axially inwardly and outwardly toward and away from each other, and the ply turn-up bag pusher means 121 through the instrumentality of the piston assembly 146 and associated parts above described provide for disposing the ply turn-up bag pusher means in operative and inoperative positions, and the tire bead setting means in operative and inoperative positions.

OPERATION OF APPARATUS

Upon reference now to FIGS. 1a and 1b, the several components are there shown in their starting positions in forming tire carcass material in the form of a tubular cylinder about the outer peripheral surfaces of the intermediate assembly 15 and the end assemblies 16. With the tire carcass material or other desired components thereof applied to the apparatus the carrier assemblies 120 are advanced axially inwardly toward each other and the piston and cylinder assembly 145 actuated to dispose the ply turn-up bag pusher means 121 in the position shown in FIG. 6 of the drawings and to position the tire bead setting means 122 in position inwardly over the outer ends of the tubular cylinder of tire carcass material at the portions thereof which are to be displaced to form tire bead shoulders. Upon actuation of the piston and cylinder assembly 145 in which fluid under pressure is admitted into the cylinder 146 to advance the piston rod 150, ring 127 is moved circumferentially relative to the frame 125 with the slot 130 engaging the head 132 of pin 133 which in turn axially retracts slide bar 140 and after taking up the lost motion of slot 135 also retracts annular member 138 to position the tire bead setting means 123 and ply turn-up pusher bag means 121 from the position shown in FIG. 1a to the position shown in FIG. 6. Energization of the piston and cylinder assembly 145 in the manner effects movement of the annular member 138 moving it from the position shown in FIG. 1a to the position shown in FIG. 6 to engage pin 175 in the slot 174 of the cam member 173 to dispose the ply turn-up pusher bag segment members 121 to the position shown in FIG. 6 of the drawings. In this latter position of the parts, a tire bead may be assembled in the tire bead shoulder 182 of the tire bead setting means 122 and with the carrier assemblies 120 being disposed over the outer ends of the tubular cylinder of tire carcass material concentrically around and in juxtaposition of the portions of the tubular cylinder of tire carcass material at which the tire bead shoulders are to be formed.

Figures 6, 7:
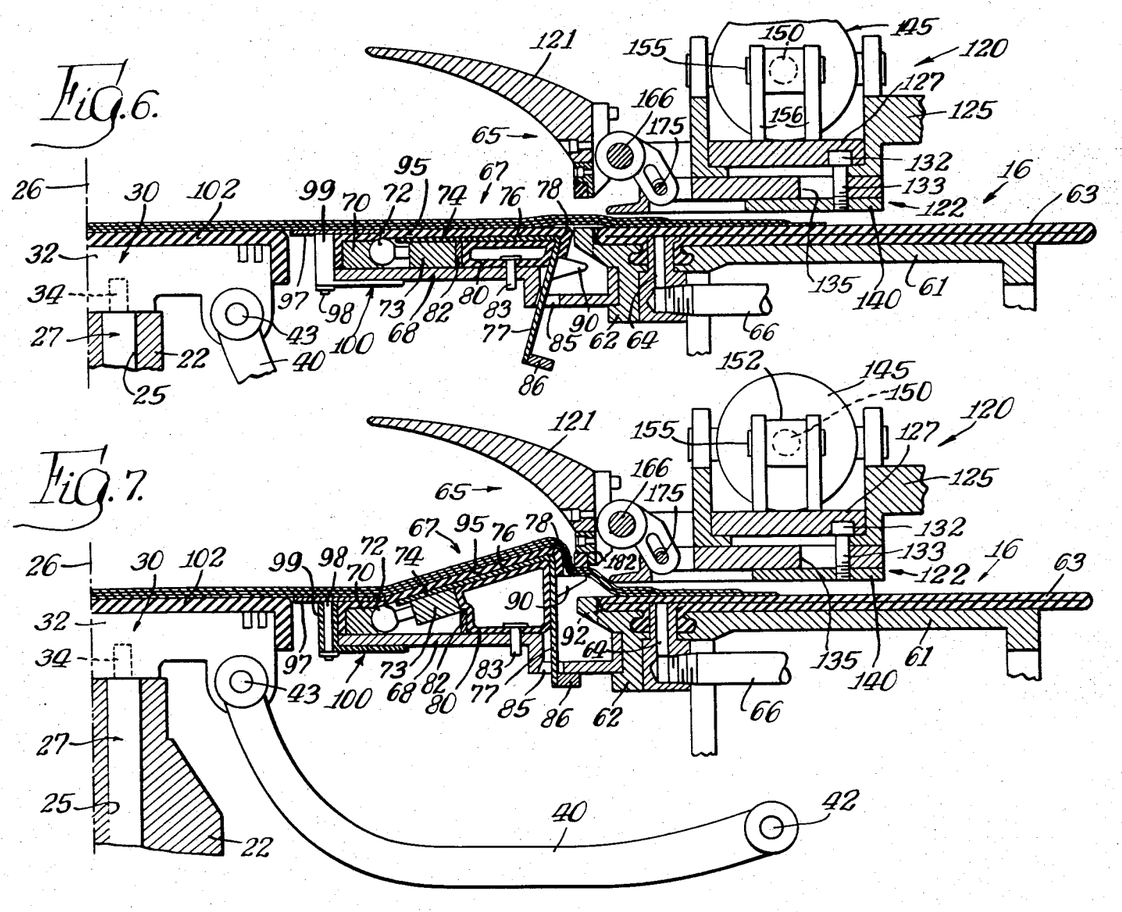
FIG. 6 is a right hand upper corner quarter sectional view of the apparatus of FIG. 1a showing the parts in position supporting tire carcass material in the form of a cylinder therearound.
FIG. 7 is a view similar to FIG. 6 showing tire bead setting means in operative position for supporting a tire bead in concentric spaced relation inwardly of one end of the tire carcass material, in which tire bead shoulder forming means of the end assembly is energized to form and seat a tire bead shoulder against the tire bead, and initial supporting means for supporting the tire bead shoulder in engagement with the tire bead.

Referring now to FIG. 7, the carrier assembly 120 there shown is disposed in its aforementioned position for supporting a tire bead in concentric relation about the portion of the tire carcass material to be displaced to form a tire bead shoulder, and in such position the tire bead shoulder bag means 80 has fluid under pressure admitted thereto pivoting the fingers 74 about the pivot axis of the bearing like ball members 72 to displace tire carcass material to form a tire bead shoulder and to engage the tire bead shoulder with the tire bead. In the position of the parts shown in this latter figure the teeth 91 of first or initial supporting means 90 have passed through the comb-like portions of the annular member 62 and engage the inner portion of the carcass material displaced to form the tire bead shoulder and thus provide a support of the tire bead shoulder in engagement with the tire bead. The stop abutment members 86 have engaged the main frame member 68 to arrest the tire bead shoulder forming means in the position shown in FIG. 7. With the displaced tire bead shoulder portions of the tire carcass material in their initially supported engagement with the tire beads the carrier assemblies 120 are retracted axially outwardly but with the ply turn-up bag pusher means 121 in its operative position.

Figure 8:
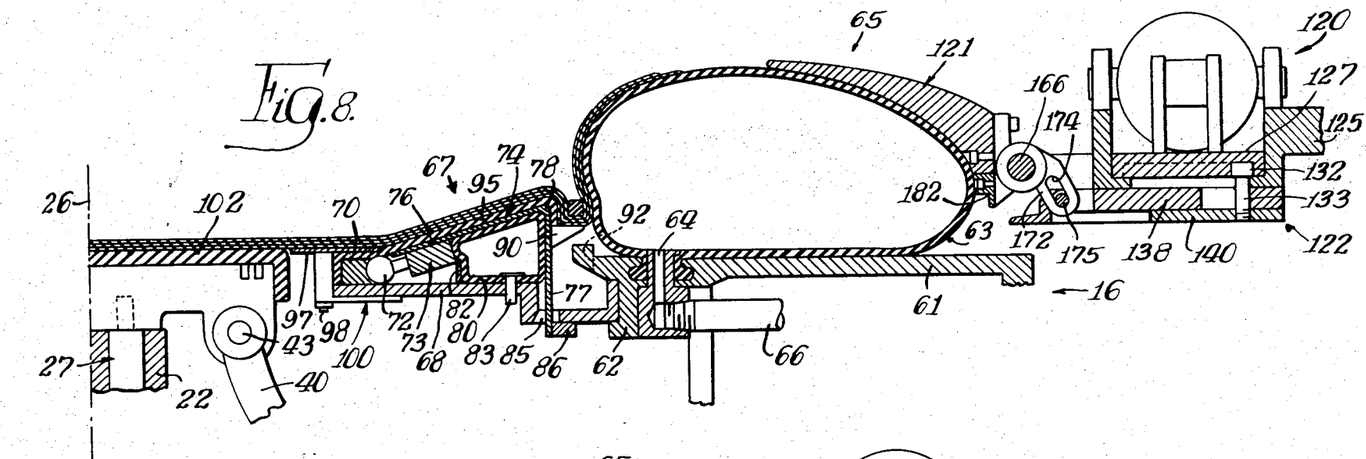
FIG. 8 is a view similar to FIG. 7 showing the tire bead setting means in retracted or inoperative position and in which inflatable ply turn-up bag means of the end assembly has been inflated and disposed with respect to ply turn-up pusher bag means for effecting encasing of the tire bead in the initially supported position of the tire bead.
Figure 9:
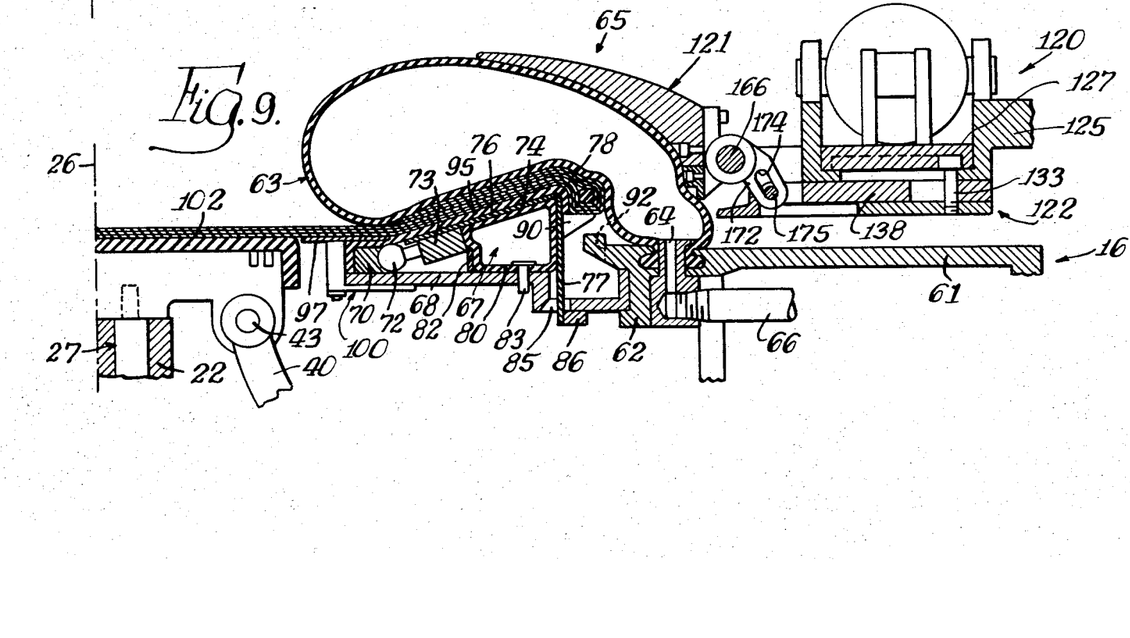
FIG. 9 is a view similar to FIG. 8 but showing the ply turn-up pusher bag means moved axially inwardly of the apparatus for effecting turn-up of the outer end portion of the tire carcass material to encase the tire bead while supported in its initial position.

As best seen in FIG. 8, the carrier assembly 120 has been moved axially outwardly from the position shown in FIG. 7 and the ply turn-up inflatable bag means 63 is charged with fluid under pressure to start the initial operation of turning up the opposite ends of the tubular cylinder around the tire beads. In the initial application of turning up the outer ends of the tubular cylinder of tire carcass material and with the ply turn-up pusher bag means 121 shown in the position of FIG. 8 about 75% of the tire beads are encased in the tire carcass material. Thereafter the end assemblies 120 are moved axially inwardly toward each other advancing from the position shown in FIG. 8 to the position shown in FIG. 9 in which the ply turn-up bag pusher means 121 has effected the complete encasing of the tire beads with the outer tubular ends of the tubular cylinder of tire carcass material. It should be particularly observed at this point that the encased tire beads are continued to be concentrically supported in engagement with the tire bead shoulders by the first or initial supporting means 90.

Figure 10:
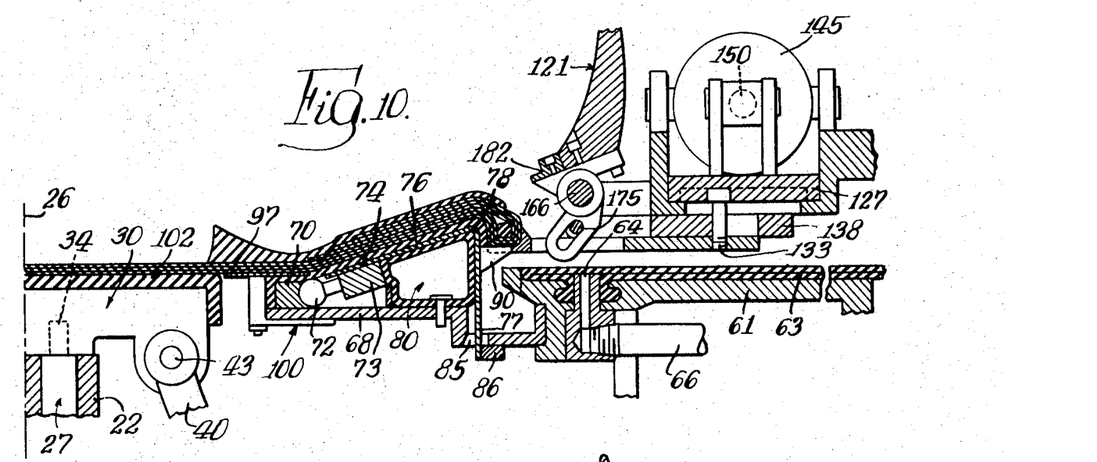
FIG. 10 is a view similar to FIG. 9 showing the ply turn-up pusher bag means in position away from the ply turn-up pusher bag means with the latter returned to its inoperative position, in which secondary supporting means is in position engaging the encased tire bead, and in which position the other components of the tire may be applied to the tire carcass material such as a side wall component and chafer strips.

Upon completion of the ply turn-ups, the piston and cylinder assembly 145 is actuated to retract the piston rod 150 and which acting through the pin 133 effects movement of ring 138 engaging pin 175 with the slot of the cam member 172 to pivot the ply turn-up pusher bag means 121 about the axis of pin 166 to the position shown in FIG. 10, and in such movement of the parts advancing the second supporting means 123 to engage the inwardly projecting end portion of slide bar 140 thereof with the encased tire bead to provide for maintaining the concentricity of the tire bead. In this position of the parts the side wall components or other desired components, such as chafter strips, may be applied to the side wall portions of the tire carcass.

Figure 11:
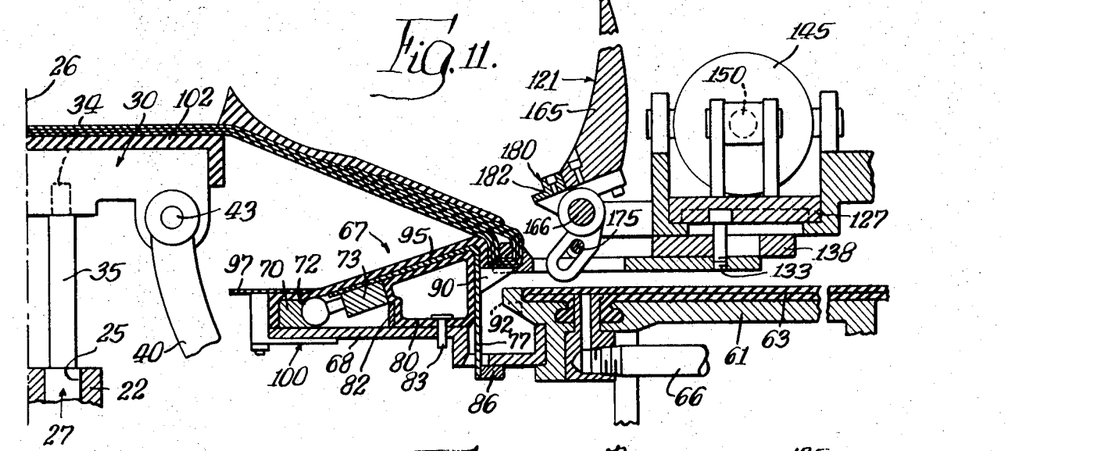
FIG. 11 is a view similar to FIG. 10 showing initial radial outward movement of the intermediate supporting members of the intermediate assembly at the beginning of the formation of the tire carcass material into torous configuration.
Figure 12:
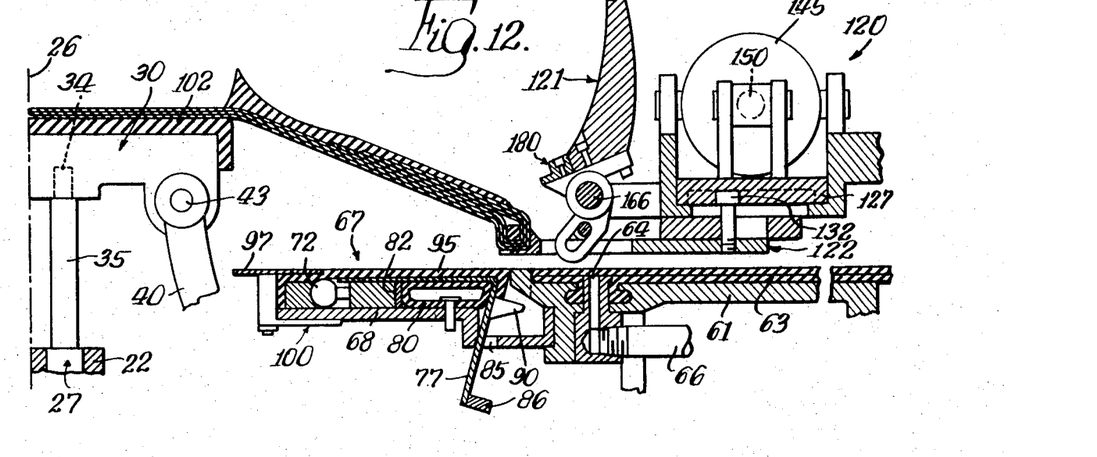
FIG. 12 is a view similar to FIG. 11 showing the tire bead shoulder forming means in retracted position and the initial supporting means for supporting the tire shoulder in engagement with the tire bead in retracted position, and in which the secondary supporting means supports the encased tire bead.

Upon completion of the application of components such as the sidewall members, the intermediate sections 30 of the intermediate assembly 15 may, by rotation of screw shaft 36 be extended radially outwardly with the encased tire beads being supported by both the first and second supporting means as seen in FIG. 11. Thereafter, and upon further radial outward extension of the intermediate supporting members 30 the tire bead shoulder means 67 are rendered inoperative, as shown in FIG. 12, by deflating the bead shoulder turn-up bag means 80 to release the first supporting means for return to inoperative position. In this latter position of parts the second or auxiliary bead supporting means 123 retains the concentric relationship of the encased tire beads. The carrier members 120 upon continued radial outward movement of the intermediate sections 30 of the intermediate assembly 15 are moved axially inwardly toward each other so that the second or auxiliary bead supporting means 123 continue to support the encased tire beads in concentric relationship until the intermediate assembly 15 has been fully radially expanded to form the tubular cylinder of tire carcass material into substantially torous configuration as shown in FIG. 13.

Figures 13, 14:
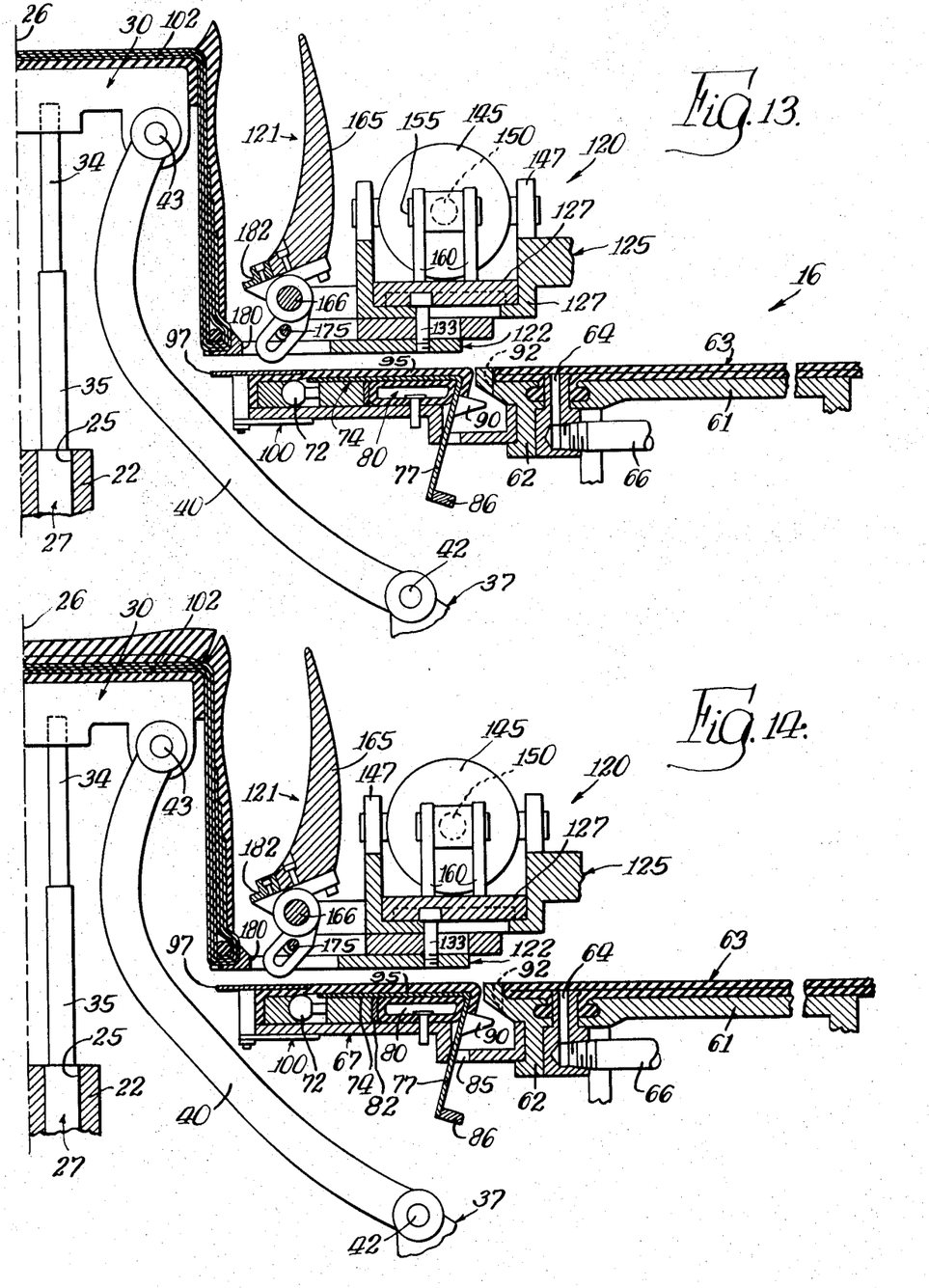
FIG. 13 is a view similar to FIG. 12 showing the supporting members of the intermediate assembly in their radial outer positions forming the tire carcass material into substantially torous configuration, and with the secondary supporting means in position supporting the encased tire bead concentrically of the end assembly of the apparatus.
FIG. 14 is a view similar to FIG. 13 but showing the application of a tread component to the outer periphery or crown portion of the tire carcass material.
Figure 15:
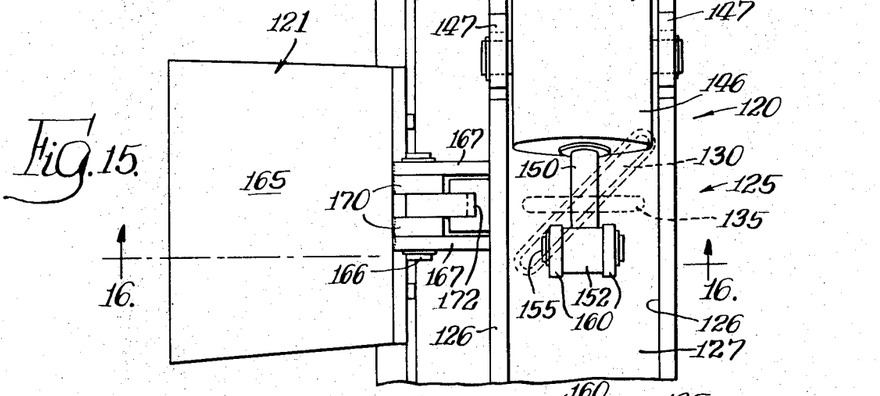
FIG. 15 is a plan view of the components of the ply turn-up pusher bag means and the secondary means for supporting an encased tire bead.
Figure 16:
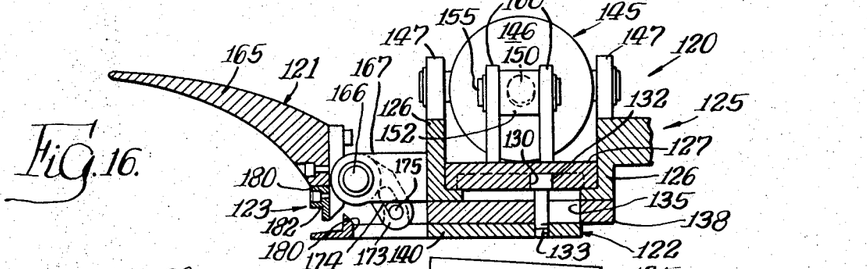
FIG. 16 is an end sectional view taken on line 16—16 of FIG. 15.

With the intermediate supporting members 30 disposed in their radial outer positions as shown in FIG. 14 a tire tread component may be applied to the crown of the torous tire carcass material, and the peripheral edges thereof may be suitably stitched or joined with the opposed edges of the side wall components to complete the tire.

Thereafter the several components may return to their initial positions as shown in FIGS. 1a and 1b and the formed tire carcass material removed for forming and curing in the conventional way.

Tires of various sizes may be readily fabricated in accordance with this invention by adjustably positioning the frames 59 on the hollow shaft 24. Also frames 59 of greater or less axial dimension may be readily incorporated in the apparatus. Further, gap shield means 100 of different axial dimension may be readily incorporated in the apparatus for accommodating tubular cylinder of tire carcass material of different axial length.

While there has been described a preferred embodiment of the invention it will be understood that various modifications and rearrangements may be made within the scope of the invention.

The invention claimed is:

1. An apparatus for building pneumatic tires comprising an intermediate assembly defined by a plurality of interleaved intermediate supporting members movable radially inwardly and outwardly between inner and outer end positions, and circumferentially relative to each other to form supporting surfaces of different diameters, and end assemblies one at each end of said intermediate assembly the outer surfaces of which at the radial inward positions of said intermediate supporting members together with the outer peripheral surfaces of said intermediate supporting members defining a substantially cylindrical supporting surface for supporting tire carcass material in the form of a tubular cylinder thereon, tire bead setting means movable axially inwardly toward each other from an inoperative position outwardly of the ends of said tubular cylinder to an operative position for supporting tire beads inwardly of the outer ends of said tubular cylinder in concentric and spaced away relation with respect to the outer surface of said tubular cylinder, radially movable tire bead shoulder forming means for radially displacing portions of said tubular cylinder opposite the tire beads for forming tire bead shoulders, and radially movable first supporting means movable radially outwardly from an inoperative position inwardly of said cylindrical supporting surface to an operative position radially outwardly of said cylindrical supporting surface for supporting said tire bead shoulders in engagement with said tire beads.

2. The apparatus of claim 1 characterized by the provision of ply turn-up means for displacing the outer ends of said tubular cylinder axially inwardly to encase the tire beads, second supporting means movable axially toward each other to first positions for supporting the encased tire beads, and said second supporting means being movable axially toward each other from their first positions with said first supporting means in inoperative position to support the encased tire beads upon radial outward movement of said intermediate supporting members to form said tire carcass material into substantially torous configuration.

3. The apparatus of claim 1 characterized by the provision of shaft means, telescopic means between said shaft means and said intermediate assembly comprising radially extending inner and outer telescopic members movable radially relative to each other upon movement of said intermediate supporting members between their radial inner and outer end positions, end head components mounted on said shaft means for axial movement toward and away from each other upon rotation of said shaft means in opposite directions, and lever means extending between said end head components and said intermediate assembly for disposing said intermediate supporting members in positions defining said supporting surfaces of different diameters at predetermined axial positions of said end head components with respect to each other.

4. The apparatus of claim 3 characterized by the provision of ply turn-up means for displacing the outer ends of said tubular cylinder axially inwardly to encase the tire beads, second supporting means movable axially toward each other to first positions for supporting the encased tire beads, and said second supporting means being movable axially toward each other from their first positions with said first supporting means in inoperative position to support the encased tire beads upon radial outward movement of said intermediate supporting members to form said tire carcass material into substantially torous configuration.

5. The apparatus of claim 1 characterized by said end assemblies each having tire carcass supporting members adjacent said tire bead shoulder means which, together with the latter in their inoperative positions define, in part, said cylindrical supporting surface, and said tire carcass supporting members having passageways therein for permitting movement of said first supporting means from their inoperative positions to their operative positions.

6. An apparatus for building pneumatic tires comprising an intermediate assembly defined by a plurality of interleaved intermediate supporting members movable radially inwardly and outwardly between inner and outer end positions, and circumferentially relative to each other to form supporting surfaces of different diameters, and end assemblies one at each end of said intermediate assembly the outer surfaces of which at the radial inward positions of said intermediate supporting members together with the outer peripheral surfaces of said intermediate supporting members defining a substantially cylindrical supporting surface for supporting tire carcass material in the form of a tubular cylinder thereon, shaft means, telescopic means between said shaft means and said intermediate assembly comprising radially extending inner and outer telescopic members movable radially relative to each other upon movement of said intermediate supporting members between their radial inner and outer end positions, end head components mounted on said shaft means for axial movement toward and away from each other upon rotation of said shaft means in opposite directions, and lever means extending between said end head components and said intermediate assembly for disposing said intermediate supporting members in positions defining said supporting surfaces of different diameters at predetermined axial positions of said end head components with respect to each other.

7. The apparatus of claim 1 characterized by said end assemblies each comprising ply turn-up drum means, inflatable bag turn-up means carried by said turn-up drum means, turn-up pusher bag means connected with said tire bead setting means movable axially toward each other from said inoperative positions of said tire bead setting means axially inwardly toward each other, said inflatable bag means upon admission of fluid pressure therein and upon axial inward movement of said turn-up pusher bag means displacing the outer ends of said tubular cylinder axially inwardly to encase the tire beads.

8. The apparatus of claim 7 characterized by the provision of second supporting means movable axially toward each other to first positions for supporting the encased tire beads, and said second supporting means being movable axially toward each other from their first positions with said first supporting means in operative position to support the encased tire beads upon radial outward movement of said intermediate supporting members to form said tire carcass material into substantially torous configuration.

References Cited

UNITED STATES PATENTS

| 3,077,917 | 2/1963 | Appleby | 156—401X |
| 3,237,199 | 2/1966 | Brey | 156—398 |
| 3,414,446 | 12/1968 | Pearce et al. | 156—401X |

SAMUEL FEINBERG, Primary Examiner

S. C. BENTLEY, Assistant Examiner

U.S. Cl. X.R.

156—403, 417